United States Patent
Shishido et al.

(10) Patent No.: US 11,868,825 B2
(45) Date of Patent: Jan. 9, 2024

(54) PROCESSOR AND EVENT PROCESSING METHOD

(71) Applicant: SANKEN ELECTRIC CO., LTD., Niiza (JP)

(72) Inventors: Hitomi Shishido, Niiza (JP); Daeun Lee, Niiza (JP); Kazuhiro Mima, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 0 days.

(21) Appl. No.: 17/679,275

(22) Filed: Feb. 24, 2022

(65) Prior Publication Data

US 2022/0179719 A1  Jun. 9, 2022

Related U.S. Application Data

(63) Continuation of application No. PCT/JP2019/035804, filed on Sep. 12, 2019.

(51) Int. Cl.
*G06F 9/54* (2006.01)
*G06F 9/30* (2018.01)

(52) U.S. Cl.
CPC .......... *G06F 9/542* (2013.01); *G06F 9/30087* (2013.01)

(58) Field of Classification Search
CPC ..... G06F 9/542; G06F 16/1734; H04L 41/06; H04L 41/0604
USPC ...................................................... 719/318
See application file for complete search history.

(56) References Cited

U.S. PATENT DOCUMENTS

| 7,350,037 B2 * | 3/2008 | Wajima | G06F 9/44521 712/238 |
| 2021/0064425 A1 * | 3/2021 | Li | G06F 9/4881 |

FOREIGN PATENT DOCUMENTS

| JP | H5-2496 A | 1/1993 |
| JP | H11-65897 A | 3/1999 |
| JP | 2017-111745 A | 6/2017 |
| JP | 2019-101543 A | 6/2019 |

OTHER PUBLICATIONS

The International Search Report of PCT/JP2019/035804 dated Nov. 5, 2019.

* cited by examiner

*Primary Examiner* — Andy Ho
(74) *Attorney, Agent, or Firm* — METROLEX IP LAW GROUP. PLLC (57) ABSTRACT

An event processing method of a processor according to one or more embodiments may include detecting an event input, which notifies an occurrence of an event, detecting a wait event by an event input, changing a status from an execution status to a wait status and outputs a count start signal by an event wait instruction, and changes a status from the wait status to the execution status and outputs a count end signal by the detection of the wait event, incrementing a counter value from an initial value by output of the count start signal, and ends counting by output of the count end signal; and receiving and storing a count value of the timer counter by output of the count end signal.

6 Claims, 7 Drawing Sheets

PROCESSOR AND EVENT PROCESSING METHOD

CROSS REFERENCE TO RELATED APPLICATIONS

This application is a continuation application of International Application No. PCT/JP2019/35804, filed on Sep. 12, 2019, the entire contents of which are incorporated herein by reference.

BACKGROUND

The disclosure relates to a processor that performs event processing and an event processing method.

An event processing unit (EPU) is used as a processor (an arithmetic unit) that executes various event processing instead of the main CPU. The EPU includes multiple hardware contexts (hereinafter referred to as threads) consisting of a program counter (PC), a general-purpose register, etc., and is configured to select a thread according to the priority and execute a sequence corresponding to the thread in a single arithmetic unit (For example, see Japanese Patent Publication No. 2019-101543 (Patent Document 1)). The sequence corresponding to the thread is stored in a program memory and indicates a location (address) in the program memory where the PC of each thread is to be executed. The arithmetic unit reads (fetches) a program code from the address in the program memory indicated by the PC of the selected thread and executes an operation corresponding to the code.

The EPU is input with an event for each thread. When an event is input and enabled, each thread enters in a RUN status, in which an instruction is being executed or requested to be executed, and a WAIT status, in which the execution of an instruction is being waited. The transition from the RUN status to the WAIT status is caused by an instruction executed by the thread. The transition from the WAIT status to the RUN status occurs when an event input to the thread occurs, or when the time measured by an internal timer has elapsed. The EPU controls the start and stop of the instruction execution for each thread according to the instruction and event input, and executes a necessary instruction when necessary.

An instruction that transitions a thread to the WAIT status is an EVTWAIT instruction. The EVTWAIT instruction includes an input event number in an operand. When an EVTWAIT instruction is executed, the thread transitions from the RUN status to the WAIT status, and when an event corresponding to the specified input event number occurs, the thread transitions from the WAIT status to the RUN status.

SUMMARY

Measurement of the time to return to the RUN status may be required after an EVTWAIT instruction is executed. For example, when the load on the power supply is light, an intermittent operation is realized by the WAIT status by an EVTWAIT instruction and a restart operation by an event input from a detection mechanism that detects a drop in an output power supply voltage in an EPU used in a power supply system that operates intermittently to achieve low power consumption. In this case, the load during standby is estimated by measuring the time between standby and restart of the power supply, which may be used for a determination of switching from an intermittent operation to a normal operation.

Currently, the time between standby and restart is measured by starting an external timer before an EVTWAIT instruction is executed and referring to a count value of the timer immediately after restart. This method consumes an external timer resource, and the time required to control the external timer directly affects the program size and execution time of a thread. The processing time may not be ignored in a power supply system that requires strict real-time performance, where a control loop may have to be executed in hundreds of ns.

In a processor and an event processing method according to one or more embodiments, the time to return to the RUN status after execution of an EVTWAIT instruction may be measured in real time without consuming an external timer resource.

A processor according to one or more embodiments is disclosed that transitions from an execution status, in which an instruction is being executed or requested to be executed, to a wait status, in which an instruction is waiting to be executed, by an event wait instruction specifying a wait event, and transitions from the wait status to the execution status by an occurrence of the wait event. The processor may include a timer counter that increments a counter value from an initial value; an event input control unit that detects an event input, which notifies the occurrence of an event; a wait event detection unit that detects the wait event by the event input; a status control unit that changes a status from the execution status to the wait status and outputs a count start signal to instruct the timer counter to start counting by the event wait instruction, and changes a status from the wait status to the execution status and outputs a count end signal to instruct the timer counter to end counting by the detection of the wait event; and a measurement value register that receives and stores a count value of the timer counter by output of the count end signal from the status control unit.

An event processing method of a processor according to one or more embodiments is disclosed that transitions from an execution status, in which an instruction is being executed or requested to be executed, by an event wait instruction specifying a wait event, and transitions from the wait status to the execution status by an occurrence of the wait event. The method may include detecting an event input, which notifies an occurrence of an event; detecting the wait event by the event input; changing a status from the execution status to the wait status and outputs a count start signal by the event wait instruction, and changes a status from the wait status to the execution status and outputs a count end signal by the detection of the wait event; incrementing a counter value from an initial value by output of the count start signal, and ends counting by output of the count end signal; and receiving in and storing the count value by output of the count end signal.

DETAILED DESCRIPTION

A processor that performs event processing and an event processing method according to one or more embodiments are explained with referring to drawings. In the respective drawings referenced herein, the same constituents are designated by the same reference numerals and duplicate explanation concerning the same constituents may be omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationships and ratios are different from one drawing to another.

Figure 1:
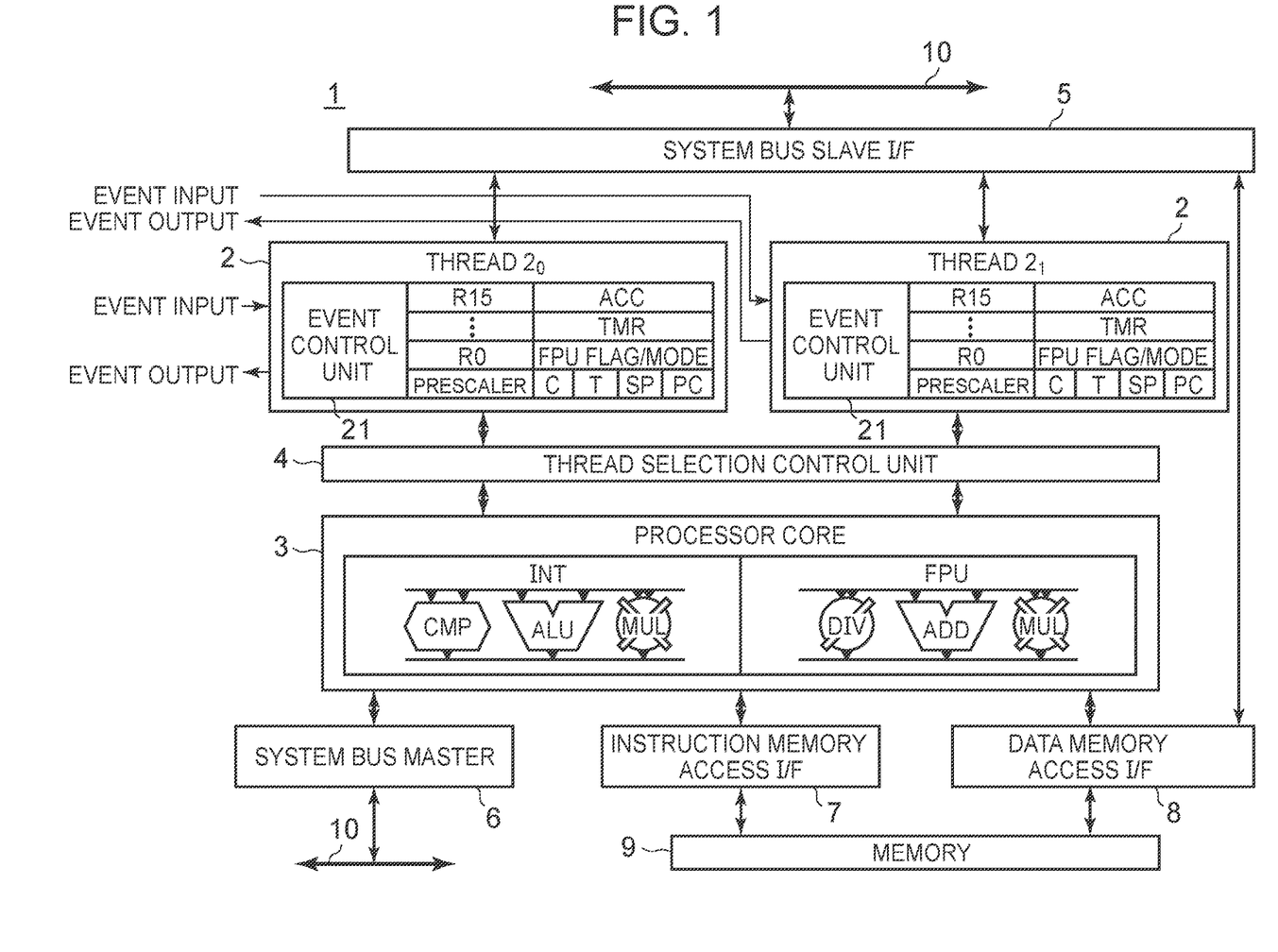
FIG. 1 is a block diagram illustrating a configuration of a processor according to one or more embodiments.

A processor 1 according to one or more embodiments may be an event processing unit (EPU) that executes various event processing as an alternative to a host system, such as the main CPU, which is not illustrated in the figure. In FIG. 1, the processor 1 includes two of thread 2 ($2_0$, $2_1$), a processor core 3, a thread selection control unit 4, a system bus slave I/F 5, a system bus master 6, an instruction memory access I/F 7, a data memory access I/F 8, and a memory 9. The processor 1 illustrated in FIG. 1 illustrates two of thread 2, but the number of the thread 2 is not limited thereto.

The thread 2 includes a 32-bit general-purpose register group including general-purpose registers R0 to R15, a storage area ACC for storing the total of 64-bit operations, a 9-bit counter timer TMR, a setting area PRESCALER for setting the count timing of the counter timer TMR, a setting area FPU flag/mode for setting an operation mode and a status of a 32-bit floating-point arithmetic unit (FPU), a stack pointer SP, a program counter PC, a carry flag C for a calculation result, and a comparison result holding area T as contexts. In addition to the above-described contexts, the thread 2 includes an event control unit 21 that controls input and output events. Except for the counter timer TMR and the event control unit 21, which are essential to the present disclosure, the components of the thread 2 may be configured in any general-purpose CPU.

The processor core 3 includes a mechanism for fetching an instruction code from the memory 9, an instruction decoder for interpreting the fetched code to determine what kind of instruction the fetched code is, an arithmetic unit, and a mechanism for processing a data access instruction. The processor core 3 includes an integer arithmetic unit INT and a floating-point arithmetic unit FPU as arithmetic units. The integer arithmetic unit INT includes an addition/subtraction logic operational circuit ALU, a comparison circuit CMP, and a multiplier MUL. The floating-point arithmetic unit FPU includes an adder-subtractor ADD, a divider DIV, and a multiplier MUL. An operation is performed by combining components of the integer arithmetic unit INT and the floating-point arithmetic unit FPU according to an instruction.

The data access instruction includes a register-to-register access instruction, a memory access instruction, and a system bus access instruction. The processor core 3 transfers data between registers via the thread selection control unit 4 by the register-to-register access instruction. The processor core 3 reads data from the memory 9 and writes data to the memory 9 via the data memory access I/F 8 by the memory access instruction. The processor core 3 reads or writes to various peripheral modules connected to the system bus 10 via the system bus master 6 by the system bus access instruction.

The thread selection control unit 4 selects one thread from an instruction execution request from each thread 2 ($2_0$, $2_1$) according to a priority order and passes the context to the processor core 3. The priority may be a fixed priority (e.g., the smaller the thread number is, the higher the priority is), a round robin (a method of circulating the priority between two threads by setting the priority of the thread immediately after execution is stopped to be the lowest), or a mixed method of the fixed priority and round robin.

The system bus slave I/F 5 is an interface between the thread 2 ($2_0$, $2_1$) and the system bus 10, and handles access from a host system, such as the main CPU, etc., via the system bus 10. Context initialization, operation start/stop, and program placement in the memory are also performed via the system bus slave I/F 5.

The system bus master 6 is an interface between the processor core 3 and the system bus 10, and controls access to the system bus 10 according to a system bus access instruction issued by the processor core 3.

The instruction memory access I/F 7 is an interface between the processor core 3 and the memory 9, receives a fetch instruction request and a fetch address from the processor core 3, and accesses the memory 9.

The data memory access I/F 8 is an interface between the processor core 3 and the memory 9, and controls access to the memory 9 according to a data memory access instruction issued by the processor core 3. The data memory access I/F 8 also handles memory access from the system bus slave I/F 5. Therefore, the data memory access I/F 8 mediates access from the processor core 3 and the system bus 10.

The memory 9 is a storage area that stores a program and data for executing an event. In the embodiment, instructions and data are stored in the single memory 9. The memory 9 includes a read-only 1 port connected to the instruction memory access I/F 7 and a read-write 1 port connected to the data memory access I/F 8.

Figure 2:
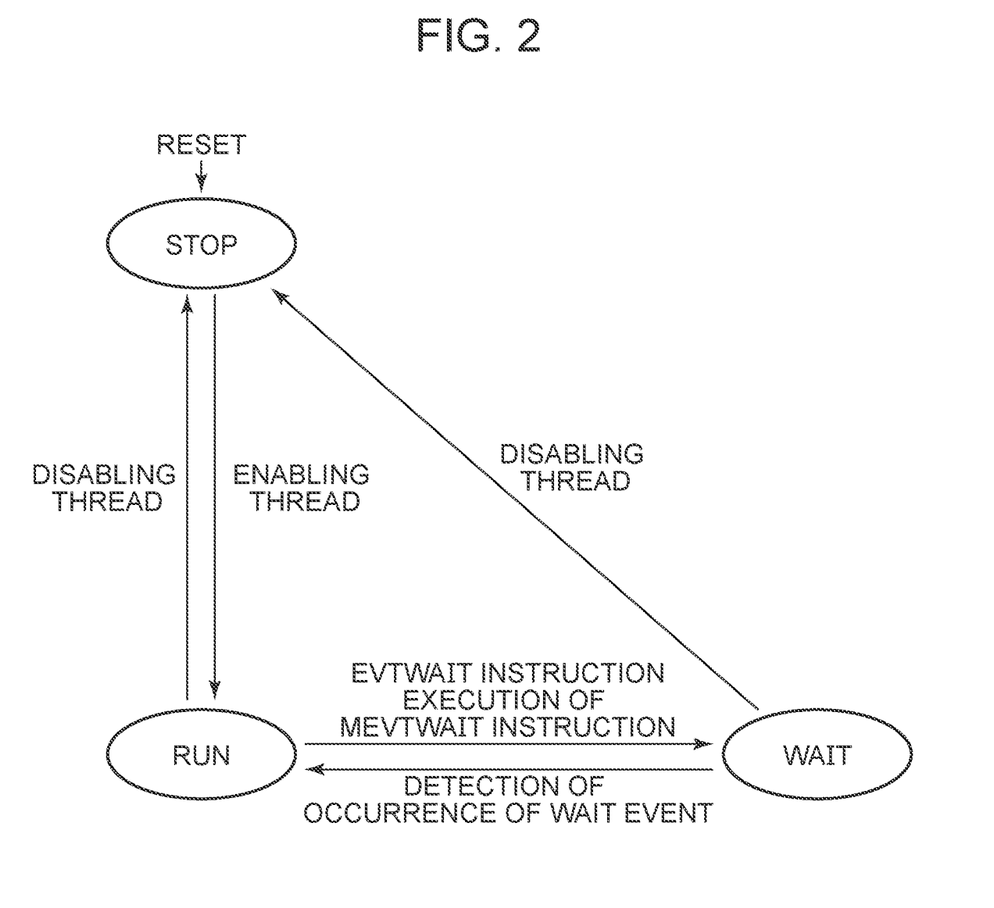
FIG. 2 is an explanatory diagram illustrating status transitions of a thread, such as is illustrated in FIG. 1.

In FIG. 2, the thread 2 transitions among a STOP status (a stop status), a RUN status (an execution status) where an instruction is being executed or requested to be executed, and a WAIT status (a wait status) where an instruction is waiting to be executed. The thread 2 in the STOP status does not issue a request for instruction execution and stops. The thread 2 is in the STOP status during initialization, such as reset, etc. The thread 2 in the RUN status outputs a request for instruction execution. The thread 2 selected by the thread selection control unit 4 accepts the instruction execution request, and the arithmetic unit (the processor core 3) executes the instruction. The thread 2 in the WAIT status temporarily stops instruction execution.

The status transition from the STOP status to the RUN status is caused by a setting in a control register from the host system, such as the main CPU, etc., or an enabling instruction from another thread 2. The status transition from the RUN status to the WAIT status is caused by an EVT-WAIT instruction (an event wait instruction) or a MEVT-WAIT instruction (a multiple event wait instruction). The status transition from the WAIT status to the RUN status is caused by the detection of the occurrence of a wait event. The status transitions from the RUN status to the STOP status and from the WAIT status to the STOP status are caused by a setting in a control register of the EPU from the host system, such as the main CPU, etc., or a disabling instruction from another thread 2.

Figure 3:
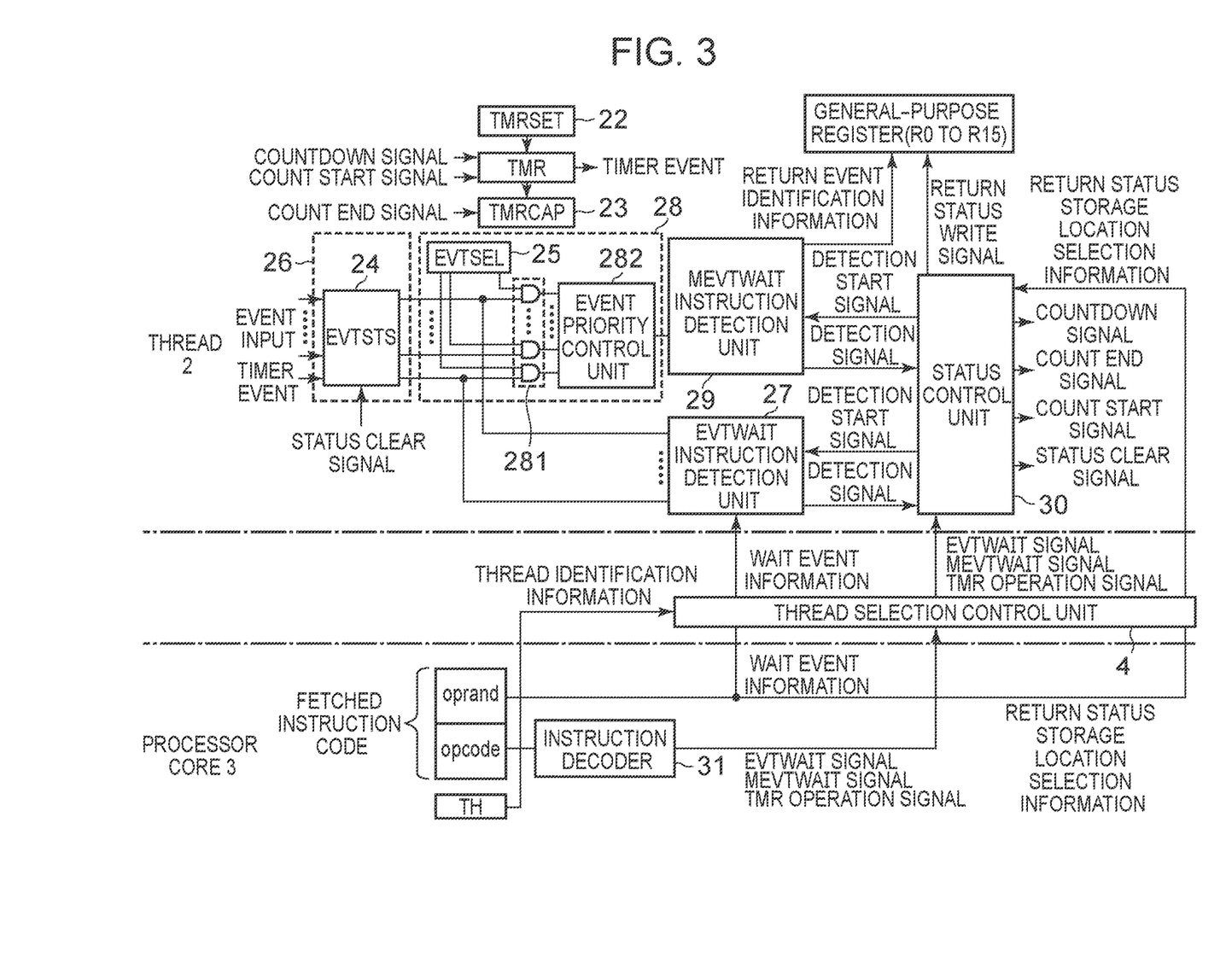
FIG. 3 is a block diagram illustrating a detailed configuration of a processor core, a thread selection control unit, and an event control unit within a thread, such as is illustrated in FIG. 1.

FIG. 3 illustrates a detailed configuration of the processor core 3, the thread selection control unit 4, and the thread 2 (an event control unit 21).

The processor core 3 fetches an instruction code of a thread selected by the thread selection unit 4 from the memory 9 in a fetch instruction mechanism, which is not illustrated in the figure, and keeps the selected thread as thread identification information. The instruction code is separated into an opcode (opcode) and an operand (oprand). The opcode indicates a type of an instruction, and the operand indicates the data and information associated with an instruction. The processor core 3 includes an instruction decoder 31. The instruction decoder 31 decodes the opcode, and outputs an EVTWAIT signal to indicate that the instruction is an EVTWAIT instruction when the instruction code is an EVTWAIT instruction, and outputs a MEVTWAIT signal to indicate that the instruction is a MEVTWAIT instruction when the instruction code is a MEVTWAIT instruction. The instruction decoder 31 decodes the opcode and also outputs a TMR operation signal to indicate that the operation of the counter timer TMR is enabled if the instruction code requests the measurement of the period when the instruction code is in the WAIT status (hereinafter referred to as the WAIT period). In the case of an EVTWAIT instruction, the operand becomes the wait event information to indicate which event is to be waited for. In the case of a MEVTWAIT instruction, the operand becomes the selection information of the return status storage location to select a register to store the return status.

The thread selection control unit 4 selects the thread 2 to execute an instruction code based on the thread identification information, and sends the wait event information, an EVTWAIT signal, a MEVTWAIT signal, a TMR operation signal, and a return status storage location selection signal to the selected thread 2.

The event control unit 21 of the thread 2 includes a TMRSET register 22, a TMRCAP register 23, an EVTSTS register 24, and an EVTSEL register 25, which operate as an event input control unit 26, an EVTWAIT instruction detection unit 27, a MEVTWAIT event control unit 28, a MEVTWAIT instruction detection unit 29, and a status control unit 30.

The counter timer TMR loads an initial value set in the TMRSET register 22 as a count value by a count start signal from the status control unit 30. The initial value is set in the TMRSET register 22 from the host system via the system bus slave I/F 5. The initial value may also be included in the operand of an instruction code and set for each instruction code.

The counter timer TMR counts down the count value at the countdown timing set in the PRESCALER by a countdown signal from the status control unit 30. The counter timer TMR outputs a timer event when the count value becomes 0 by the countdown signal.

The TMRCAP register 23 imports the count value of the counter timer TMR by a count end signal from the status control unit 30.

The EVTSTS register 24 is a status register with one bit allocated for each event, and operates as the event input control unit 26, which detects an event that has occurred. The event input (occurrence of an event) causes the corresponding status bit in the EVTSTS register 24 to be set to 1, thereby detecting an event that has occurred. In addition to an input from an external function module, the event input includes a timer event output from the counter timer TMR. A status clear signal output from the status control unit 30 sets the corresponding status bit in the EVTSTS register 24 from 1 to 0, indicating that no event has been detected.

The EVTWAIT instruction detection unit 27 waits for a status bit of the EVTSTS register 24 corresponding to a wait event to be set to 1 by a detection start signal from the status control unit 30. When the EVTWAIT instruction detection unit 27 detects a status bit of the EVTSTS register 24 corresponding to a wait event is 1, the EVTWAIT instruction detection unit 27 outputs a detection signal to the status control unit 30.

The EVTSEL register 25 is a status register with one bit allocated for each event, and is set with multiple events to be waited for by a MEVTWAIT instruction. The EVTSEL register 25 is set by the host system via the system bus slave I/F 5. The setting of the EVTSEL register 25 may also be included in the operand of an instruction code and set for each instruction code.

The EVTSEL register 25 operates with a selection unit 281, which selects an event to be waited for by performing a bitwise AND operation between the EVTSTS register 24 and the EVTSEL register 25, and an event priority control unit 282, which performs priority control when multiple events to be waited for are detected simultaneously, as the MEVTWAIT event control unit 28, which detects the occurrence of an event waited for by a MEVTWAIT instruction to output to the MEVTWAIT instruction detection unit 29. Hereinafter, an event detected by the MEVTWAIT event control unit 28 is referred to as a MEVTWAIT event. The priority control by the event priority control unit 282 may be a predetermined fixed priority, a round robin, or a mixed method of the fixed priority and round robin, etc.

The MEVTWAIT instruction detection unit 29 waits for the detection of a MEVTWAIT event by the MEVTWAIT event control section 28 by a detection start signal from the status control section 30. When a MEVTWAIT event is detected by the EVTWAIT event control unit 28, the MEVTWAIT instruction detection unit 29 outputs a detection signal to the status control unit 30 and outputs the return event identification information to the general-purpose register group R0 to R15 as information to identify the detected MEVTWAIT event.

The general-purpose register group R0 to R15 receives a return status write signal from the status control unit 30 specifying the return status storage location (one of the registers R0 to R15), and writes the return event identification information to one of the specified registers R0 to R15. Thus, by confirming the return event identification information after returning from the MEVTWAIT instruction, which event has returned after the MEVTWAIT instruction may be determined, and switching the processing after returning may be conducted.

The status control unit 30 outputs a detection start signal to the EVTWAIT instruction detection unit 27 by an EVT-WAIT signal, and changes the thread 2 from the RUN status to the WAIT status. The status control unit 30 changes the thread 2 from the WAIT status to the RUN status by a detection signal from the EVTWAIT instruction detection unit 27, restarts the thread's instruction execution, and outputs a status clear signal to the EVTSTS register 24.

The status control unit 30 outputs a detection start signal to the MEVTWAIT instruction detection unit 29 by a MEVTWAIT signal, and changes the thread 2 from the RUN status to the WAIT status. The status control unit 30 changes the thread 2 from the RUN status to the WAIT status by a detection signal from the MEVTWAIT instruction detection unit 29, restarts the thread's instruction execution, outputs a status clear signal to the EVTSTS register 24, and outputs a return status write signal specifying the return status storage location to the general-purpose register group R0 to R15.

When a TMR operation signal is input along with an EVTWAIT signal or a MEVTWAIT signal, the status control unit 30 outputs a counting start signal. The status control unit 30 outputs a countdown signal during the WAIT status, and outputs a count end signal at the transition from the WAIT status to the RUN status.

An operation of the processor 1 by an EVTWAIT instruction with a measurement request for a WAIT period is explained in detail with reference to FIG. 4 and FIG. 5.

Figure 4:
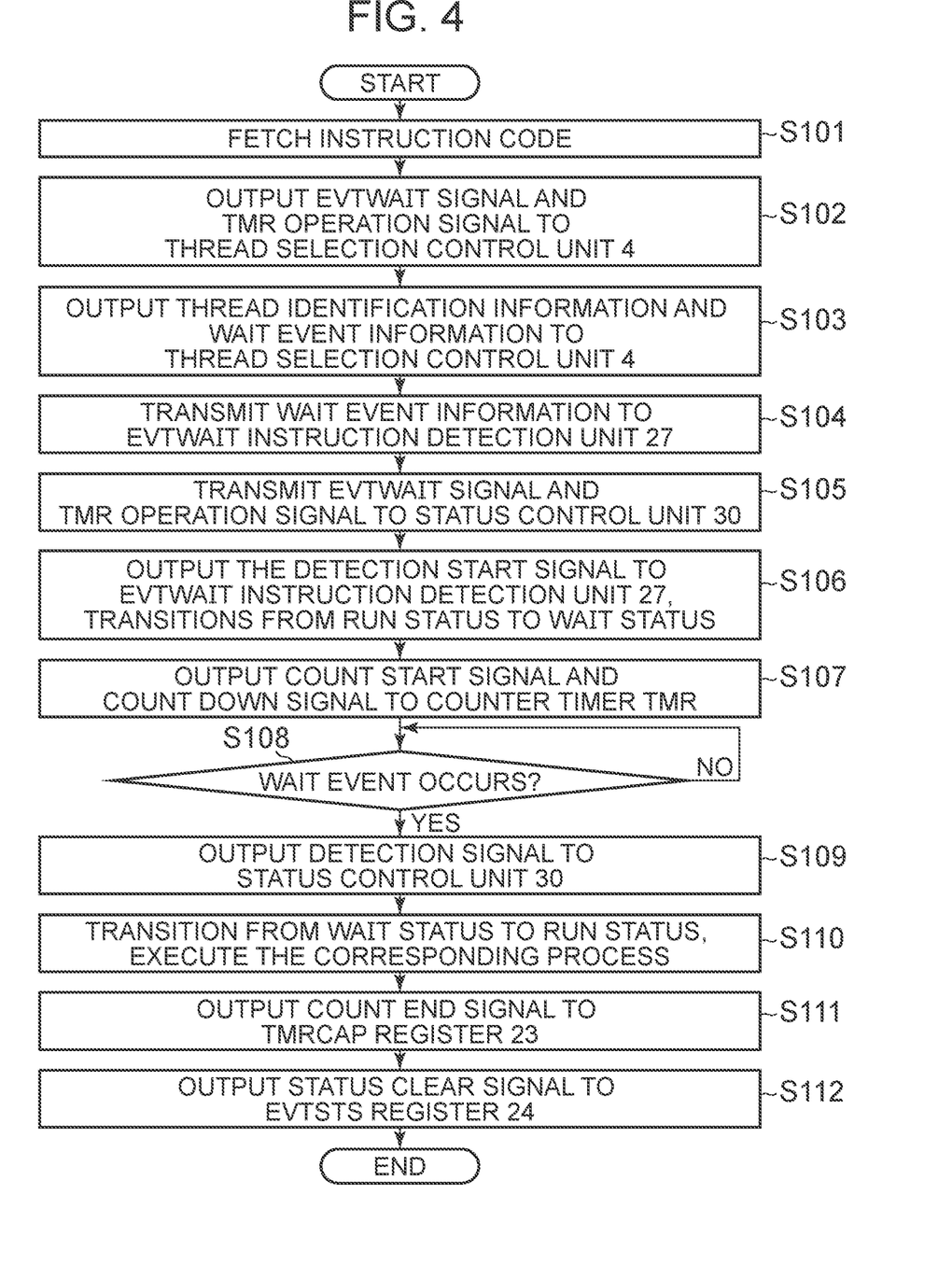
FIG. 4 is a flowchart illustrating an operation of a processor, such as is illustrated in FIG. 1, by an EVTWAIT instruction with a request to measure a WAIT period.

In FIG. 4, the processor core 3 fetches an instruction code from a memory address indicated by the program counter PC of the thread selected by the thread selection control unit 4 (step S101), and keeps the selected thread number as thread identification information.

The instruction decoder 31 of the processor core 3 decodes an opcode and outputs an EVTWAIT signal, which indicates an EVTWAIT instruction, and a TMR operation signal, which indicates that the operation of the counter timer TMR is enabled, to the thread selection control unit 4 (step S102).

The processor core 3 outputs the thread identification information and the wait event information of the operand to the thread selection control unit 4 (step S103).

The thread selection control unit 4 selects the thread 2 to execute an instruction code based on the thread identification information, sends the wait event information to the EVTWAIT instruction detection unit 27 of the selected thread 2 (step S104), and sends an EVTWAIT signal and a TMR operation signal to the status control unit 30 (step S105).

The status control unit 30 outputs a detection start signal to the EVTWAIT instruction detection unit 27 by the EVTWAIT signal and changes the thread 2 from the RUN status to the WAIT status (step S106).

The status control unit 30 outputs a count start signal by the TMR operation signal and a countdown signal during the WAIT status to the counter timer TMR (step S107).

Figure 5:
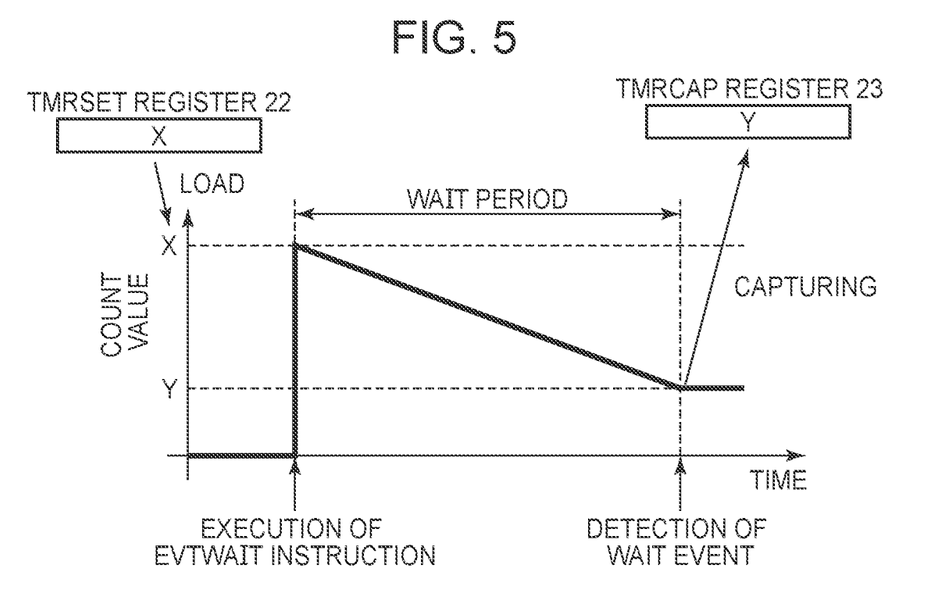
FIG. 5 is an explanatory diagram illustrating an operation of a counter timer, such as is illustrated in FIG. 1.

As illustrated in FIG. 5, by the count start signal, the initial value X set in the TMRSET register 22 is loaded in the counter timer TMR as a count value. The count value of the counter timer TMR is counted down at the countdown timing set in the PRESCALER by a countdown signal input during the WAIT status.

By the detection start signal from the status control unit 30, the EVTWAIT instruction detection unit 27 waits for the status bit of the EVTSTS register 24 corresponding to the wait event to be 1, that is, waits for the occurrence of a wait event (step S108).

When the status bit of the EVTSTS register 24 corresponding to the wait event becomes 1 in the step S108, the EVTWAIT instruction detection unit 27 outputs a detection signal to the status control section 30 (step S109).

By the detection signal from the EVTWAIT instruction detection unit 27, the status control section 30 changes the status of the thread 2 from the WAIT status to the RUN status to execute the process corresponding to the EVTWAIT instruction (step S110), outputs a count end signal to the TMRCAP register 23 (step S111), and outputs a status clear signal to the EVTSTS register 24 to terminate the event wait operation (step S112).

As illustrated in FIG. 5, by the count end signal, a count value Y of the counter timer TMR at the time of the input of the count end signal is captured to the TMRCAP register 23. Therefore, the host system may grasp the WAIT period by referring to the count values in the TMRSET register 22 and the TMRCAP register 23. In other words, a value, which is obtained by multiplying the difference between the initial value X of the TMRSET register 22 and the count value Y+1 captured in the TMRCAP register 23 by a countdown cycle, may be measured as the WAIT period from the execution of the EVTWAIT instruction to the detection of a wait event. The reset timing of the TMRCAP register 23 may be set by the host system as appropriate.

Figure 6:
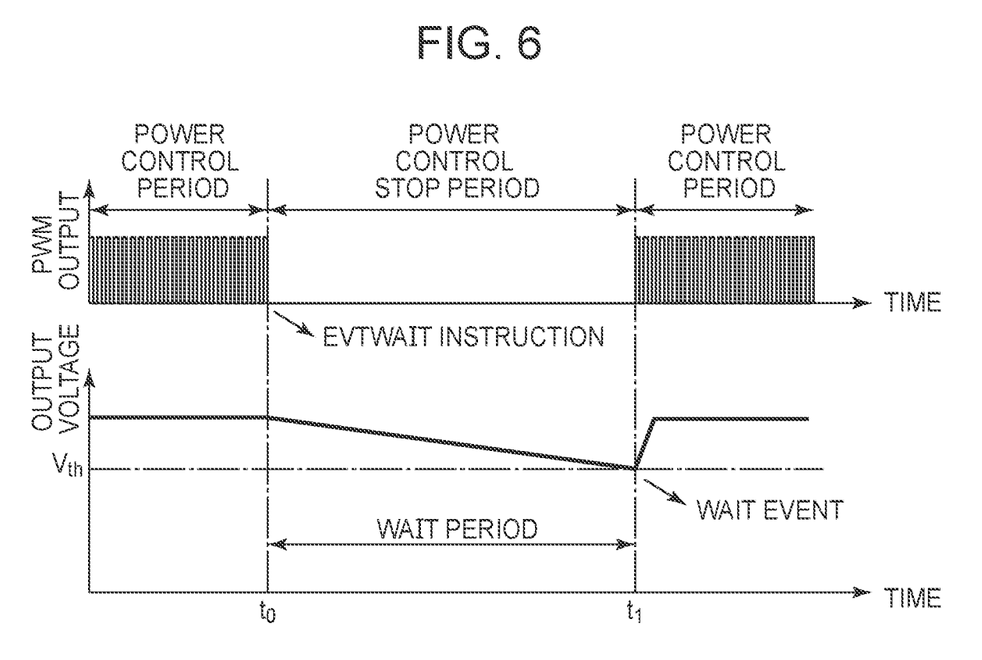
FIG. 6 is an explanatory diagram illustrating an example of an application of a processor to a power supply system according to one or more embodiments.

In a power supply system, as illustrated in FIG. 6, a PWM output is operated intermittently to reduce power consumption when the load on the power supply is light. When a drop in output current is detected at a time $t_0$, the light load is recognized, and the power supply control is stopped. Then, the output voltage drops according to the charge capacitance of an output capacitor. When the output voltage falls below a threshold voltage $V_{th}$ at a time $t_1$, the power supply control is restarted to recover the output voltage. The intermittent operation is expected to improve the efficiency because no switching operation by the power supply control occurs during the period when the power supply control is stopped.

The intermittent operation may be realized by the WAIT status by an EVTWAIT instruction and a restart operation (the RUN status) by the event input from a detection mechanism of the output voltage drop. In this case, the EVTWAIT instruction, in which the drop in the output voltage to the threshold voltage $V_{th}$ is a wait event, is input to the processor 1 at the time $t_0$ when the drop in output current is detected, and the processor 1 changes to the WAIT status.

A wait event is detected at the time $t_1$ when a drop in the output voltage to the threshold voltage $V_{th}$ is detected. As a result, a power control stop period from the time $t_0$ to time $t_1$ is measured as the WAIT period. The current consumption during the wait period may be estimated from the power control stop period, drop voltage, and external load capacitance. Therefore, it may be possible to estimate the load during standby and use the estimation in a decision to switch from the intermittent operation to the normal operation, and control may be performed to improve efficiency at light loads.

Figure 7:
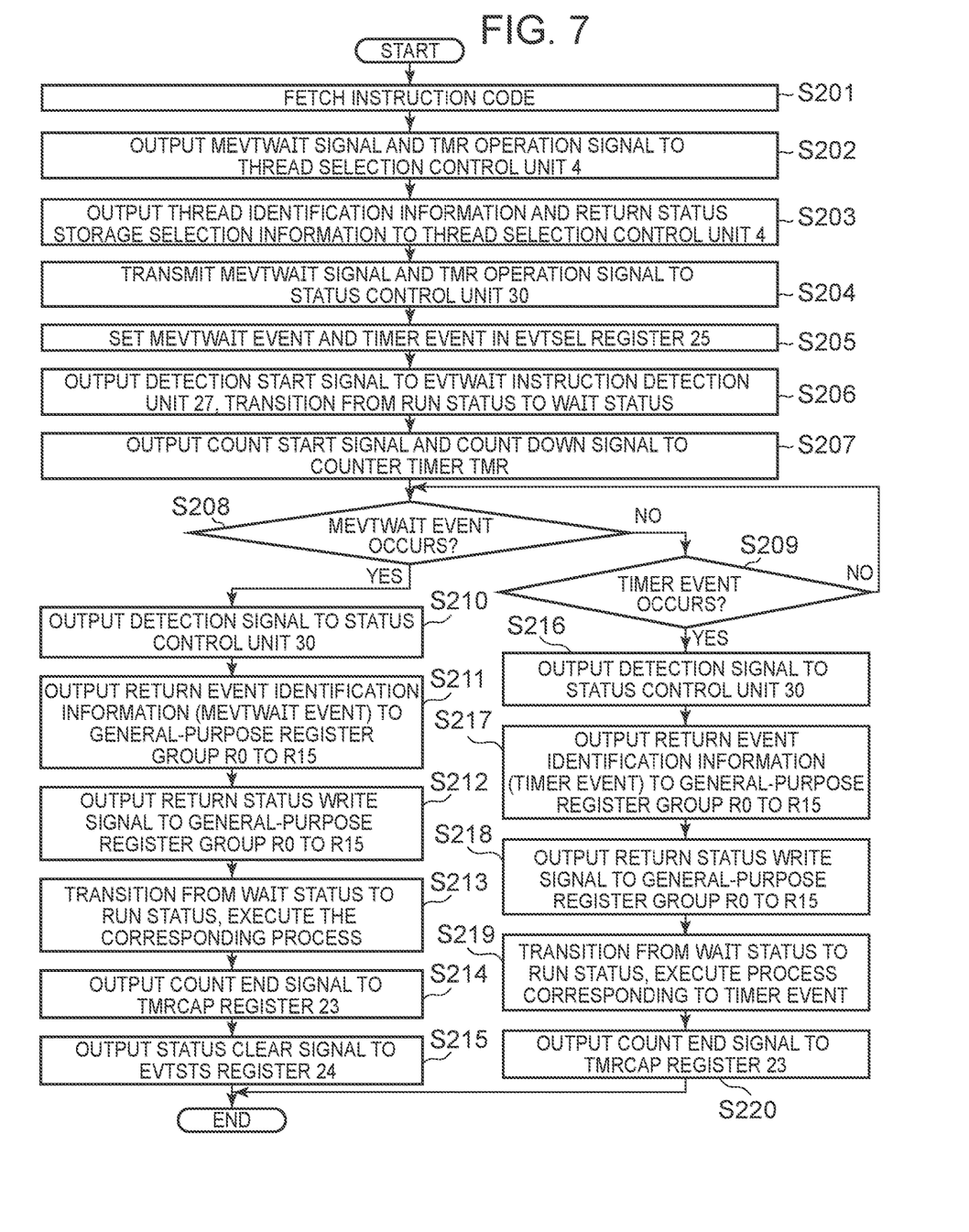
FIG. 7 is a flowchart illustrating an operation of a processor, such as is illustrated in FIG. 1, by a MEVTWAIT instruction with a request to measure a WAIT period.

Referring to FIG. 7, the processor core 3 fetches an instruction code from a memory address indicated by the program counter PC of the thread selected by the thread selection control unit 4 (step S201), and keeps the selected thread number as thread identification information.

The instruction decoder 31 of the processor core 3 decodes an opcode, and outputs a MEVTWAIT signal indicating a MEVTWAIT instruction and a TMR operation signal indicating that an operation of the counter timer TMR is enabled to the thread selection control unit 4 (step S202).

The processor core 3 outputs the thread identification information and return status storage selection information of the operand to the thread selection control unit 4 (step S203).

The thread selection control unit 4 selects the thread 2 to execute the instruction code based on the thread identification information, and sends the MEVTWAIT signal and the TMR operation signal to the status control unit 30 (step S204). In the EVTSEL register 25, multiple MEVTWAIT events to be waited for by the MEVTWAIT instruction by the host system and a timer event are stored in the EVTSEL register 25 (step S205).

By the MEVTWAIT signal, the status control unit 30 outputs a detection start signal to the MEVTWAIT instruction detection unit 29, and changes the status of the thread 2 from the RUN status to the WAIT status (step S206).

By the TMR operation signal, the status control unit 30 outputs a count start signal and the countdown signal during the WAIT status to the counter timer TMR (step S207).

Figure 8A:
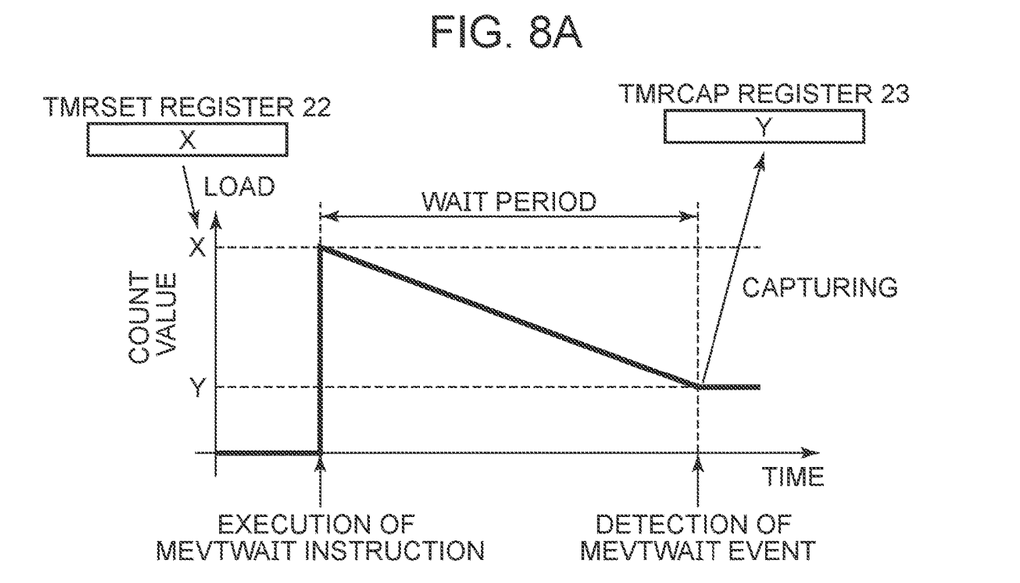
FIGS. 8A and 8B are explanatory diagrams illustrating operations of a counter timer, such as is illustrated in FIG. 1.
Figure 8B:
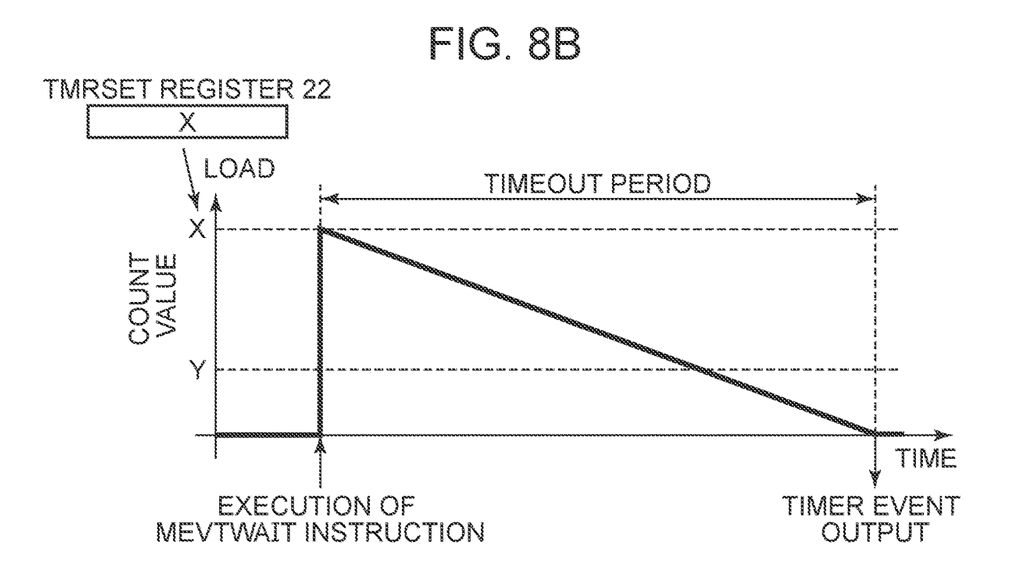

As illustrated in FIGS. 8A and 8B, by the count start signal, the initial value X set in the TMRSET register 22 is loaded to the counter timer TMR as a count value. The count value of the counter timer TMR is counted down at the countdown timing set in the PRESCALER by the countdown signal input during the WAIT status.

By the detection start signal from the status control section 30, the MEVTWAIT instruction detection unit 29 waits for the detection of a MEVTWAIT event by the MEVTWAIT event control unit 28, that is, the occurrence of one of the multiple MEVTWAIT events to be waited for (step S208), and waits for the detection of a timer event by the MEVTWAIT event control unit 28 (step S209).

When the MEVTWAIT event is detected by the MEVTWAIT event control unit 28 in the step S208, the MEVTWAIT instruction detection unit 29 outputs a detection signal to the status control unit 30 (step S210), and outputs the return event identification information to the general-purpose register group R0 to R15 as information to identify the detected MEVTWAIT event (step S211).

By the detection signal from the MEVTWAIT instruction detection unit 29, the status control unit 30 outputs a return status write signal that specifies the return status storage location to the general-purpose register group R0 to R15 (step S212). As a result, the return event identification information from the MEVTWAIT instruction detection unit 29 is written into one of the general-purpose registers R0 to R15 specified by the return status write signal.

By the detection signal from the MEVTWAIT instruction detection unit 27, the status control section 30 changes the status of the thread 2 from the WAIT status to the RUN status to execute the process corresponding to the MEVTWAIT instruction (step S213). When executing a process, the process may be switched according to an event that occurred by referring to the return event identification information written in one of the general-purpose registers R0 to R15.

The status control unit 30 outputs a count end signal to the TMRCAP register 23 (step S214), and outputs a status clear signal to the EVTSTS register 24 (step S215) to terminate the event wait operation.

As illustrated in FIG. 8A, by the count end signal, a count value Y of the counter timer TMR at the time of the input of the count end signal is captured into the TMRCAP register 23. Therefore, the host system may grasp the WAIT period by referring to the count values of the TMRSET register 22 and the TMRCAP register 23. In other words, a value, which is obtained by multiplying the difference between the initial value X of the TMRSET register 22 and the count value Y+1 captured in the TMRCAP register 23 by a countdown cycle, may be measured as the WAIT period from the execution of the EVTWAIT instruction to the detection of a wait event.

The reset timing of the TMRCAP register 23 may be set by the host system as appropriate.

As illustrated in FIG. 8B, when the count value of the counter timer TMR becomes 0 and the timer event is detected by the MEVTWAIT event control unit 28 in the step S209, the MEVTWAIT instruction detection unit 29 outputs a detection signal to the status control unit 30 (step S216) and outputs the return event identification information specifying the detected timer event to the general-purpose register group R0 to R15 (step S217).

By the detection signal from the MEVTWAIT instruction detection unit 27, the status control section 30 outputs a return status write signal that specifies the return status storage location to the general-purpose register group R0 to R15 (step S218). As a result, the return event identification information from the MEVTWAIT instruction detection unit 29 is written into one of the general-purpose registers R0 to R15 specified by the return status write signal.

By the detection signal from the MEVTWAIT instruction detection unit 27, the status control unit 30 changes the status of the thread 2 from the WAIT status to the RUN status to execute the process corresponding to the timer event (step S219). When executing the process, the process corresponding to the timer event may be executed by referring to the return event identification information written in one of the specified general-purpose registers R0 to R15.

The status control unit 30 outputs a status clear signal to the EVTSTS register 24 (step S220) to terminate the event wait operation. Note that the status control unit 30 also outputs the count end signal to the TMRCAP register 23. However, since the count value of the counter timer TMR is 0, no change occurs in the TMRCAP register 23.

Therefore, a condition when a wait event that is being waited for by a MEVTWAIT instruction does not occur after waiting for a certain period of time is recognized, and a process corresponding to a timer event that is different from the normal processing may be executed. The time that is obtained by multiplying the initial value X set in the TMRSET register 22 by the countdown cycle is a timeout period to wait for a MEVTWAIT event.

As described above, the processor 1 according to one or more embodiments transitions from the RUN status (the execution status), in which an instruction is being executed or requested to execute, to the WAIT status (the wait status), in which an instruction is waiting to be executed, by an EVTWAIT instruction (the event wait instruction), which specifies a wait event, and transitions from the WAIT status to the RUN status by the occurrence of a wait event. The processor 1 includes: the timer counter TMR that starts counting from an initial value; the event input control unit 26 that detects the event input notifying the occurrence of an event; the EVTWAIT instruction detection unit 27 (the wait event detection unit) that detects a wait event by the event input; the status control unit 30, which changes the status from the RUN status to the WAIT status by the EVTWAIT instruction to output a count start signal to instruct the timer counter TMR to start counting and changes the status from the WAIT status to the RUN status by the detection of a wait event to output a count end signal to instruct the timer counter TMR to end counting; and the TMRCAP register 23 (the measurement value register), which takes in and holds the count value of the timer counter TMR by the output of the count end signal from the status control unit 30.

The configuration may allow the host system to grasp the WAIT period by referring to the count values of the TMRSET register 22 (the initial value) and the TMRCAP register 23, and the time to return to the RUN status after execution of an EVTWAIT instruction (the WAIT period) may be measured in real time without consuming an external timer resource.

The status control section 30 according to one or more embodiments changes the status from the RUN status to the WAIT status by a MEVTWAIT instruction (a multiple event wait instruction) specifying multiple wait events, and outputs a count start signal that instructs the timer counter TMR to start counting. Also, the status control unit 30 changes the status from the WAIT status to the RUN status by detecting one of the multiple wait events specified by the MEVT-WAIT instruction from the MEVTWAIT instruction detection unit 29 (the wait event detection unit), and outputs a count end signal to instruct the timer counter TMR to stop counting.

The configuration may allow multiple events to be specified as wait events.

The timer counter TMR according to one or more embodiments outputs a timer event as an event input when the count value reaches a set value, and the MEVTWAIT instruction detection unit 29 detects the timer event as one of the multiple wait events.

The configuration may recognize a condition when a wait event does not occur even after waiting for a certain period of time.

The processor according to one or more embodiments includes the general-purpose registers R0 to R15 (the identification information registers) that hold the wait event identification information, which specifies a wait event detected by the MEVTWAIT instruction detection unit 29.

With the configuration, the wait event identification information held in the general-purpose registers R0 to R15 may be used to recognize the wait event that has occurred, and a process may be switched by the wait event that has occurred.

In the processor and the event processing method according to one or more embodiments, the host system may measure the time to return to the execution status after the execution of an event wait instruction by referring to the count values of the initial value and the measurement value register in real time without consuming an external timer resource.

The present invention may not be limited to the above-described embodiments, and that each embodiment may be changed as appropriate within the scope of the technical concept of the present invention. The number, position, shape, etc. of the above-described components may not be limited to the above-described embodiments, and may be made into a number, position, shape, etc. suitable for implementing the present invention. The same sign is assigned to the same component in each figure.

1: Processor
2: Thread
3: Processor core
4: Thread selection control unit
5: System bus slave I/F
6: System bus master
7: Instruction memory access I/F
8: Data memory access I/F
9: Memory
21: Event control unit
22: TMRSET register
23: TMRCAP register
24: EVTSTS register
25: EVTSEL register
26: Event input control unit
27: EVTWAIT instruction detection unit
28: MEVTWAIT event control unit
29: MEVTWAIT instruction detection unit
30: Status control unit
31: Instruction decoder

The invention claimed is:

1. A processor that transitions from an execution status, in which an instruction is being executed or requested to be executed, to a wait status, in which an instruction is waiting to be executed, by an event wait instruction specifying a wait event, and transitions from the wait status to the execution status by an occurrence of the wait event, comprising:
   a timer counter that increments a counter value from an initial value;
   an event input control unit that detects an event input, which notifies the occurrence of an event;
   a wait event detection unit that detects the wait event by the event input;
   a status control unit that changes a status from the execution status to the wait status and outputs a count start signal to instruct the timer counter to start counting by the event wait instruction, and changes a status from the wait status to the execution status and outputs a count end signal to instruct the timer counter to end counting by the detection of the wait event; and
   a measurement value register that receives and stores a count value of the timer counter by output of the count end signal from the status control unit.

2. The processor according to claim 1, wherein
the status control unit changes a status from the execution status to the wait status by a multiple event wait instruction that specifies the wait event and outputs a count start signal to instruct the timer counter to start counting, and changes a status from the wait status to the execution status and outputs a count end signal to instruct the timer counter to end counting by the detection of one of the wait events specified in the multiple event wait instruction.

3. The processor according to claim 2, wherein
the timer counter outputs a timer event as the event input when a count value reaches a set value, and
the wait event detection unit detects the timer event as one of the wait events.

4. The processor according to claim 2, further comprising:
an identification information register that holds wait event identification information, which identifies the wait event detected by the wait event detection unit.

5. The processor according to claim 3, further comprising:
an identification information register that holds wait event identification information, which identifies the wait event detected by the wait event detection unit.

6. An event processing method of a processor that transitions from an execution status, in which an instruction is being executed or requested to be executed, by an event wait instruction specifying a wait event, and transitions from the wait status to the execution status by an occurrence of the wait event, the method comprising:
   detecting an event input, which notifies an occurrence of an event;
   detecting the wait event by the event input;
   changing a status from the execution status to the wait status and outputs a count start signal by the event wait instruction, and changes a status from the wait status to the execution status and outputs a count end signal by the detection of the wait event;
   incrementing a counter value from an initial value by output of the count start signal, and ends counting by output of the count end signal; and receiving in and storing the count value by output of the count end signal.

* * * * *